(12) United States Patent
Smeja

(10) Patent No.: US 9,300,118 B2
(45) Date of Patent: Mar. 29, 2016

(54) SYSTEM FOR MANAGING MULTIPLE CABLES

(71) Applicant: Limitless Innovations, Inc., McHenry, IL (US)

(72) Inventor: Michael V. Smeja, Inverness, IL (US)

(73) Assignee: Limitless Innovations, Inc., McHenry, IL (US)

( * ) Notice: Subject to any disclaimer, the term of this patent is extended or adjusted under 35 U.S.C. 154(b) by 208 days.

(21) Appl. No.: 14/068,812

(22) Filed: Oct. 31, 2013

(65) Prior Publication Data

US 2014/0116744 A1    May 1, 2014

Related U.S. Application Data

(60) Provisional application No. 61/720,987, filed on Oct. 31, 2012.

(51) Int. Cl.
*H02G 3/08* (2006.01)
*H02G 3/32* (2006.01)

(52) U.S. Cl.
CPC ... *H02G 3/08* (2013.01); *H02G 3/32* (2013.01)

(58) Field of Classification Search
USPC .......................................................... 174/50
See application file for complete search history.

(56) References Cited

U.S. PATENT DOCUMENTS

| | | | |
|---|---|---|---|
| 3,809,331 A | 5/1974 | Gaul | |
| 4,901,938 A | 2/1990 | Cantley | |
| 5,162,719 A | 11/1992 | Tomura et al. | |
| 5,200,685 A | 4/1993 | Sakamoto | |
| 5,466,886 A * | 11/1995 | Lengyel et al. | 174/487 |
| 5,489,010 A | 2/1996 | Rogers | |
| 5,669,571 A | 9/1997 | Graybill | |
| 5,690,198 A | 11/1997 | Lohr | |
| 5,853,136 A | 12/1998 | Lai | |
| 6,048,211 A | 4/2000 | Liaom | |
| 6,065,708 A | 5/2000 | Matsubara | |
| 6,331,121 B1 | 12/2001 | Raeford, Sr. | |
| 6,378,797 B1 | 4/2002 | Liaom | |
| 6,702,077 B2 | 3/2004 | Showronski | |
| 6,713,674 B2 * | 3/2004 | Chang | 174/50 |

(Continued)

OTHER PUBLICATIONS

GlobalSouces web page [online]; [retrieved on Apr. 6, 2012]; retrieved from the Internet: URL: <upo.manufacturer.globalsources.com/...gelmage; Auto-retractable-Cat.5-6/product_id-1008675099/action-GetProduct.htm>.

(Continued)

*Primary Examiner* — Dhirubhai R Patel
(74) *Attorney, Agent, or Firm* — Reed Smith LLP

(57) ABSTRACT

A system for managing a plurality of cables that are connectable to one or more electronic devices is described. The system includes a housing and a plurality of openings in the housing. Each opening is dimensioned to receive one or more cables entering and/or exiting the housing. At least one of the plurality of openings is dimensioned to receive two or more of the plurality of cables at a given time. The system further includes an inner space defined by the housing. The inner space is configured to store at least a portion of each of the plurality of cables within the housing. Also, the system includes a weighted disk located within the inner space. The weighted disk has a weight sufficient to maintain the system in a substantially stationary position on a substantially level surface.

14 Claims, 6 Drawing Sheets

(56) References Cited

U.S. PATENT DOCUMENTS

| | | |
|---|---|---|
| 6,966,791 B1 | 11/2005 | Farr |
| 7,168,967 B1 | 1/2007 | Yen |
| 7,464,893 B2 | 12/2008 | Spjet |
| 7,649,279 B2 | 1/2010 | Lanni |
| 7,863,770 B2 | 1/2011 | Lanni |
| 7,901,241 B1 | 3/2011 | Larkin |

OTHER PUBLICATIONS

Alibaba web page [online]; [retrieved on Apr. 6, 2012:' retrieved from the Internet: URL: <www.alibaba.com/product-gs/512931025/Cuystom_plasti_mouse_cable_wire_organizer.html>.

* cited by examiner

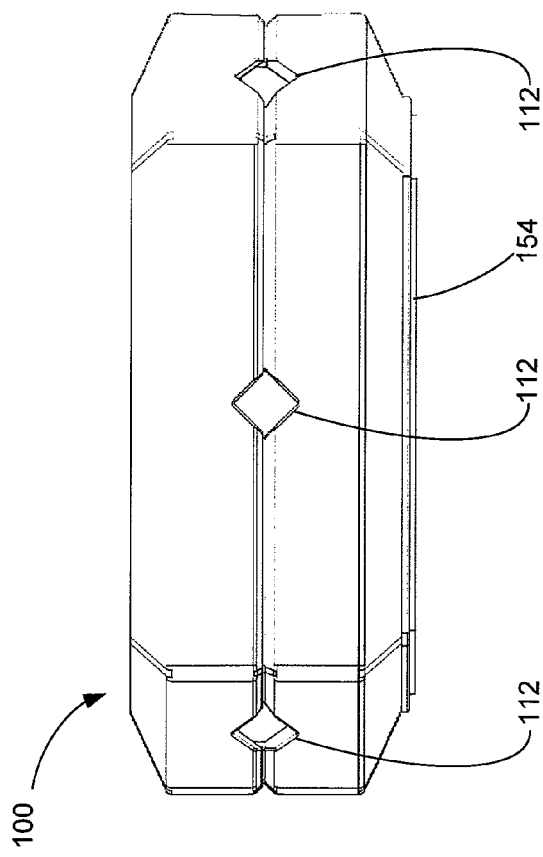
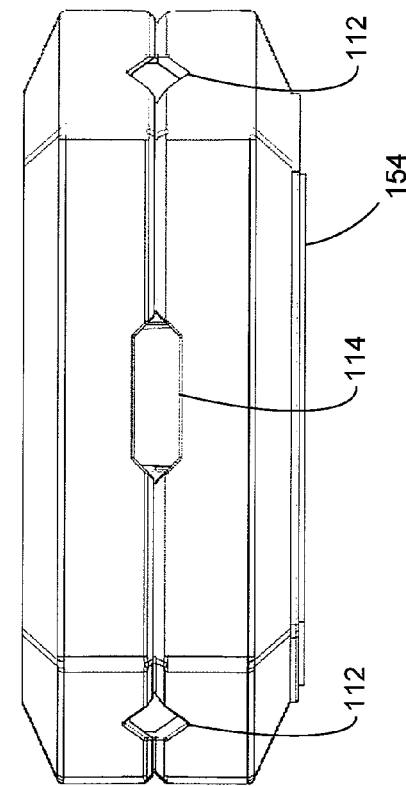
FIG. 1B
FIG. 1C

SYSTEM FOR MANAGING MULTIPLE CABLES

BACKGROUND OF THE INVENTION

The description that follows relates to an improved system for managing a plurality of cables that are associated with various electronic devices.

In today's world, the average person may operate, and/or carry, several electronic devices throughout a typical day, such as, for example, a mobile telephone, a personal digital assistant (PDA), a personal computer (e.g., a laptop, a tablet, an electronic reader, etc.), a digital camera, a Bluetooth headset, an audio listening device (e.g., headphones), a personal media player (e.g., MP3 player, dedicated music player, etc.), a hand-held gaming device, etc. Many electronic devices require a power cord for charging a rechargeable battery included therein, and some require a cable for connecting the device to a computer and sharing information therewith. Unfortunately, too many of these electronic devices require unique cords or cables that have no universal alternative. In addition to power and data cables, electronic devices that have Internet capability may require an Ethernet cable for connecting to an Ethernet port. Trying to manage these various cords and cables can be a particularly cumbersome task, especially when multiple electronic devices are being operated in a given space.

SUMMARY OF THE INVENTION

The present invention is defined by the appended claims. This description summarizes some aspects of the present embodiments and should not be used to limit the claims.

The foregoing problems are solved and a technical advance is achieved by a system for managing a plurality of cables that are associated with a plurality of electronic devices, as described herein.

One embodiment includes a system for managing a plurality of cables that are connectable to one or more electronic devices. The system comprises a housing and a plurality of openings in the housing. Each opening is dimensioned to receive one or more cables entering and/or exiting the housing. At least one of the plurality of openings is dimensioned to receive two or more of the plurality of cables at a given time. The system further comprises an inner space defined by the housing. The inner space is configured to store at least a portion of each of the plurality of cables within the housing. Also, the system comprises a weighted disk located within the inner space. The weighted disk has a weight sufficient to maintain the system in a substantially stationary position on a substantially level surface.

Other articles of manufacture, features, and advantages of the present invention will be, or will become, apparent to one having ordinary skill in the art upon examination of the following drawings and detailed description. It is intended that all such additional articles of manufacture, features, and advantages included within this description be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

FIG. 1B is an illustration showing a side view of the multi-cable management system shown in FIG. 1;

FIG. 1C is an illustration showing another side view of the multi-cable management system shown in FIG. 1;

Illustrative and exemplary embodiments of the invention are described in further detail below with reference to and in conjunction with the figures.

DETAILED DESCRIPTION

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the disclosure is intended to cover all such embodiments that may fall within the scope of the appended claims, either literally or under the doctrine of equivalents.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

Figure 1A:
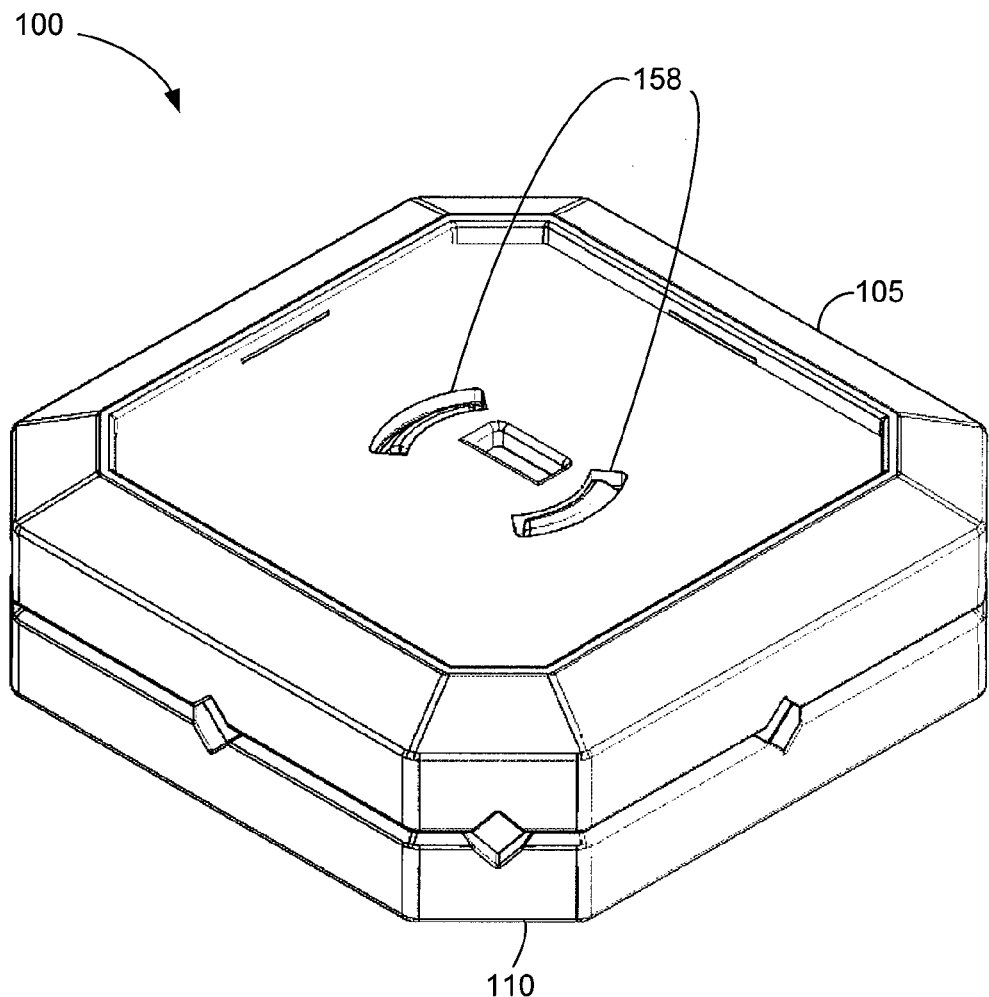
FIG. 1A is an illustration showing a perspective view of an embodiment of a multi-cable management system as disclosed herein.

FIGS. 1A-C illustrate an embodiment of a multi-cable management system 100 that includes a housing 105 with a plurality of openings 110 for managing multiple cables, cords, wires or the like. The types of cables that may be organized, stored, or otherwise managed by the system 100 can include, but are not limited to, power cords, data cables (e.g., Universal Serial Bus (USB) cables, etc.), audio cables (e.g., speaker wires, headphones wires, etc.), video cables, audiovisual cables, Internet cables (e.g., Ethernet cables, telephone cords, etc.) and any other cable that may be required by an electronic device. Each of a plurality of cables can enter the housing 105 through one of the openings 110 and exit the housing 105 through a second opening 110. The housing 105 may include a space, or inner space, for storing at least a portion of each cable passing through the housing 105, so as to minimize the amount of cable extending from the system 100, as will be discussed in more detail with respect to FIG. 3. The system 100 may be placed on a desktop, a countertop, a tabletop, or any other surface where the management and organization of multiple cables associated with multiple electronic devices may be desirable. For example, the user may wish to place the system 100 near an electric socket (e.g., wall outlet, power strip, etc.) and/or an Internet connection (e.g., Ethernet jack, phone jack, etc.), so that an exiting end of each cable may be appropriately coupled thereto. As another example, the user may wish to place the system 100 on a surface that is large enough to accommodate the electronic devices associated with the cables being managed by the system 100.

In some embodiments, a majority of the openings 110 can be configured as entry ports 112, as shown in FIG. 1B, for receiving cables as they enter the system 100, and at least one of the openings 110 can be configured as an exit port 114, as shown in FIG. 1C, for receiving cables as they exit the system 100. According to these embodiments, the exit port 114 may be larger than the entry ports 112, so that all the cables entering the housing 105 through various entry ports 112 may fit through the single exit port 114. For example, according to one embodiment, the exit port 114 may be dimensioned to receive up to seven cables at a time, while the entry ports 112 may be dimensioned to receive one cable at a time.

In FIGS. 1A, 1B, and 1C, the entry ports 112 are shown as being similar in size and having a square-like shape that is rotated (e.g., 90 degrees) onto its side. And the exit port 114 is shown as having a hexagon-like shape that has been elongated in order to receive multiple cables. As will be appreciated, the openings 110 are not limited to the illustrated size and shape and may have any of a number of sizes and/or shapes in accordance with the principles disclosed herein. For example, in some embodiments, each of the openings 110 may have polygonal shapes. In other embodiments, each of the openings 110 may have rounded or circular shapes, as shown by circular openings 210 in FIG. 5. In one embodiment, the entry ports 112 may have a circular shape, and the exit port 114 may have an oval or ovoid shape.

In some embodiments, the size and/or shape of the openings 110 can be selected based on the dimension(s) of one or more commercially available cables, such as, for example, an average USB cable, an average Ethernet cable, an average power cord for a laptop computer, etc. In yet another embodiment, the entry ports 112 can be configured to have several different sizes and/or shapes to accommodate various types of cables, thereby enabling the system 100 to be used for managing cables associated with a greater variety of electronic devices. For example, in one embodiment (not shown), a first entry port may be sized and/or shaped to receive a thin, rounded cable (e.g., a headphone wire), a second entry port may be sized and/or shaped to receive a flat or rectangular-shaped cable (e.g., a video camera cable), a third entry port may be sized and/or shaped to receive a thick, rounded cable (e.g., an Ethernet cable), a fourth entry port may be sized and/or shaped to receive a medium-sized, rounded cable (e.g., a power cord), and so on.

It will be appreciated that though the figures show the openings 110 in certain configurations, the principles disclosed herein are not limited to the exact number, size, and/or type of openings 110 shown in the illustrated embodiments. For example, in the illustrated embodiment, the housing 105 has eight openings 110. However, the system 100 can be configured to have any number of openings 110 and is not limited by the illustrations. As another example, in some embodiments, at least some of the openings 110 can be designated as entry/exit ports (not shown) that can be used for receiving either entering cables or exiting cables. For example, some electronic devices may need to be coupled to each other, rather than to a wall outlet. In other embodiments, the openings 110 may not be specifically designated as entry and/or exit ports and may be used for either purpose to suit the user's cable organization needs.

Figure 2:
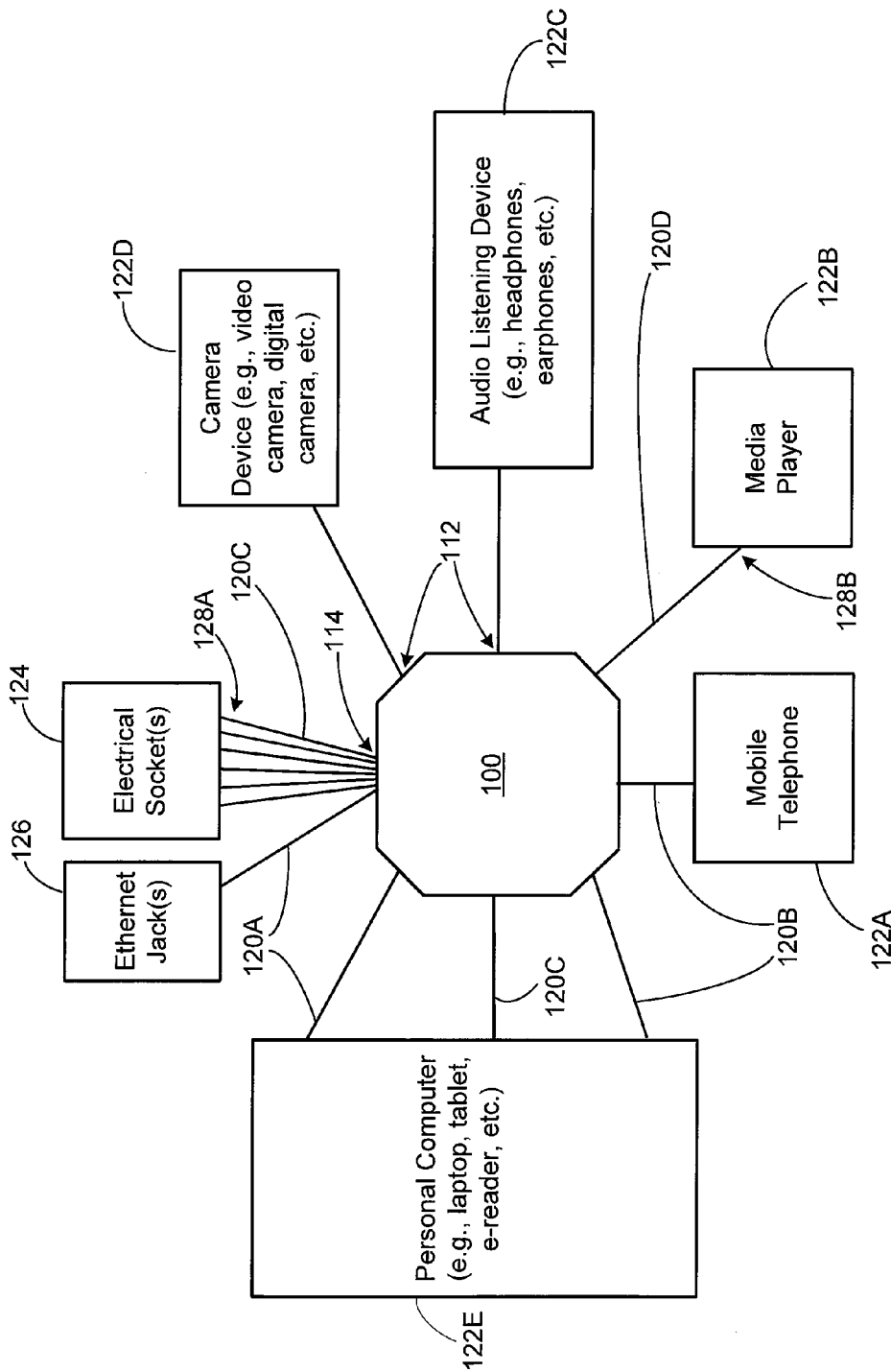
FIG. 2 is a diagram of the multi-cable management system shown in FIG. 1.

Referring now to FIG. 2, shown is a diagram of the system 100 receiving a plurality of cables 120 from a plurality of electronic devices 122 and outputting the cables 120 towards one or more electrical sockets 124, communication ports 126, or other electronic devices 122. In the illustrated embodiment, the openings 110 of the housing 105 are radially arranged so that, upon placement into the system 100, the cables 120 may radiate from the system 100 without overlapping With each other (e.g., in a "hub and spoke" type configuration). In addition to organizing the cables 120, placing the openings 110 in a radial arrangement around the housing 105 may also improve the stability of the system 100. For example, a tension may be created in the cables 120 when each end of the cable 120 is coupled to one of the electronic devices 122, sockets 124, and/or ports 126. By virtue of placing the openings 100 in a radial arrangement around the housing 105, this cable tension can be evenly distributed around the housing 105 and thereby, hold the system 100 in a relatively stationary position on a substantially level surface.

In one example, a user can utilize the system 100 to organize the plurality of cables 120 by inserting a first end 128A of each of the cables 120 into a respective entry port 112, guiding the first end 128A through the inside of the housing 105 and out of the exit port 114, and plugging the first end 128A into a respective socket 124 or port 126. A second end 128B of each of the cables 120 can remain extended from a respective entry port 112 so as to be accessible to the user when, for example, the user wishes to couple one of the electronic devices 122 to a corresponding cable 120.

In one embodiment, the above-described radial arrangement can be achieved by spacing the openings 110 equidistantly apart around the housing 105. In another embodiment, each of the openings 110 can be aligned with an axis passing through a center of the housing 105. For example, in the illustrated embodiment, the openings 110 are aligned with one of four XY axes passing through the center of the housing 105 (e.g., a vertical axis, a horizontal axis, a first diagonal axis, and a second diagonal axis, opposite from the first).

In FIG. 2, the system 100 is shown as receiving cables 120 from the plurality of electronic devices 122 through the entry ports 112. In the illustrated example, the electronic devices 122 being used in association with the system 100 include a mobile telephone 122A, a media player 122B (e.g., an MP3 player, a DVD player, a personal media player, etc.), an audio listening device 122C (e.g., headphones, earphones, earbuds, headsets, etc.), a camera 122D (e.g., video camera, photography camera, digital multi-purpose camera, etc.), and a personal computer 122E (e.g., laptop, tablet, e-reader, etc.). A multitude of other personal electronic devices 122 may be used in connection with the system 100, including, but not limited to, a PDA, a gaming device, a Bluetooth headset, a digital photo frame, a digital telephone system, a computer screen, a printer, an audio device (e.g., digital alarm clock, radio, stereo system, etc.), and a computer accessory (e.g., a wired mouse, a wired keyboard, etc.).

As will be appreciated, some electronic devices 122 may require more than one cable 120. As an example, a given electronic device may require a power cord, a data cord, and/or an Ethernet cord. The system 100 can be used to organize multiple cables 120 for each electronic device 122. For example, in FIG. 2, the computer 122E has three cables 120 entering the system 100: an Ethernet cable 120A coupled to the Ethernet jack 126 for providing an Internet connection, a USB cable 120B coupled to the mobile telephone 122A for downloading data thereto/from and/or providing power thereto, and a power cord 120C coupled to the electrical socket 124 for providing power to the computer 122E.

Figure 3:
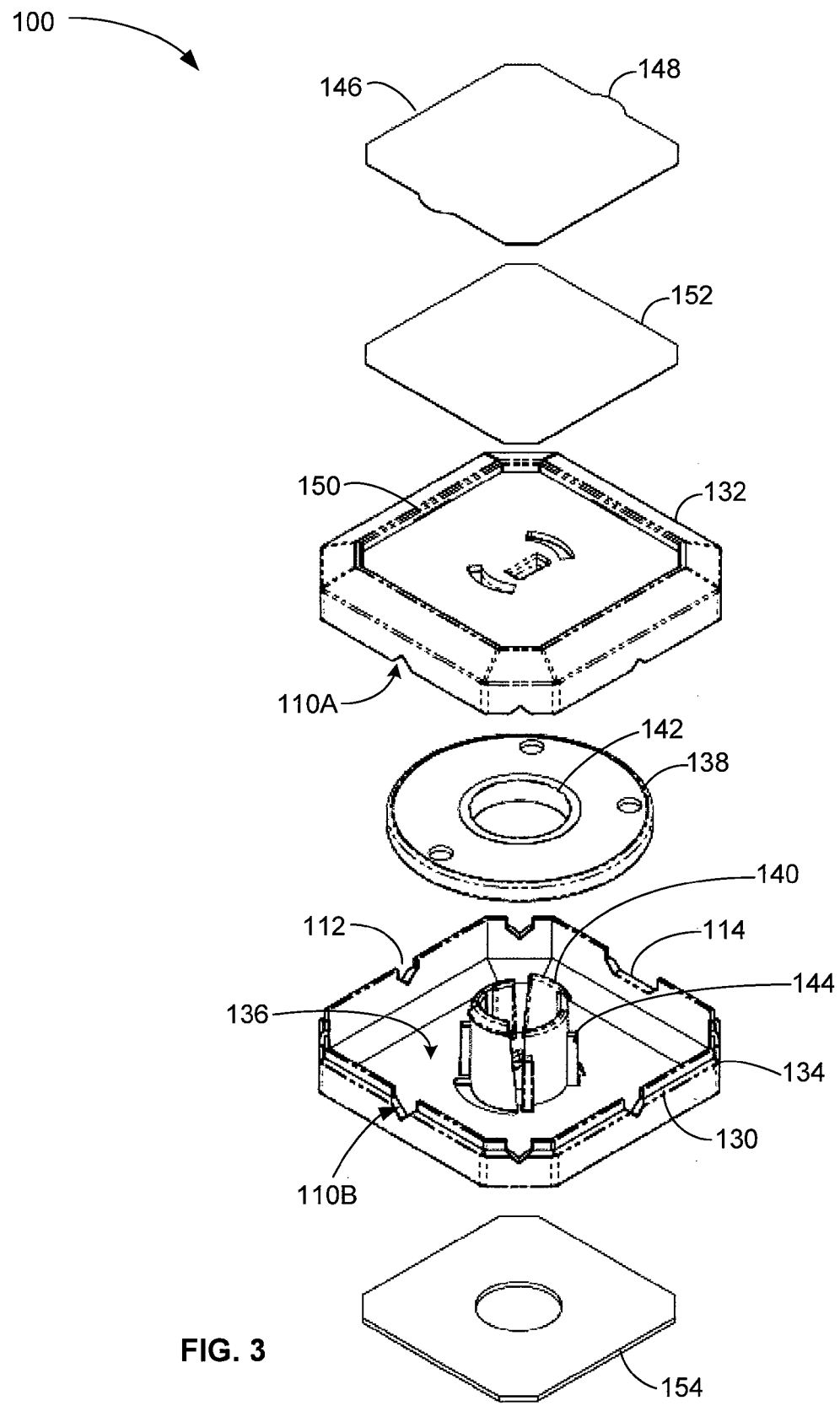
FIG. 3 is an illustration showing an exploded view of the multi-cable management system shown in FIG. 1.

Referring now to FIG. 3, shown is an exploded view of the system 100. As described above, the system 100 includes housing 105 and openings 110. In FIG. 3, the housing 105 is shown as a two-piece housing that opens at a channel 130 into a top portion or cover 132 and a bottom portion or base 134. In one embodiment, the cover 132 and the base 134 can be substantially equal halves of the housing 105. In another embodiment, the housing 105 can divide into unequal portions when opened. For example, the base 134 may be larger than the cover 132 to provide more storage space for the cables 120 within the base 134. In some embodiments, the openings 110 may be located adjacent to the channel 130, so that when the housing 105 is opened, the openings 110 may become split into two portions along with the housing 105. For example, a top portion 110A of the openings 110 may remain with the cover 132 and a bottom portion 110B of the openings 110 may remain with the base 134, as shown in FIG. 3. While the cover 130 and the base 132 are shown as separate pieces in the illustrated embodiment, in another embodiment, the housing 105 can be a clamshell-type housing, where the cover 130 and the base 132 are fixedly attached by a hinge (not shown).

As shown in FIG. 3, the system 100 can include a storage space 136 (also referred to as a central hub or an inner space) defined by inner surfaces of the housing 105 and configured for storing at least a portion of the cables 120 within the housing 105. As an example, the housing 105 can be specifically dimensioned (e.g., height and diameter or width) to create sufficient storage space 136 for storing at least a portion of each of the plurality of cables 120 at a given time. In some embodiments, the storage space 136 may be capable of accommodating up to seven cables at a time. In one embodiment, the housing 105 may be between 1.25 and 1.30 inches tall and between 3.4 and 3.5 inches wide. However, the system 100 can be configured to have other dimensions and capacity specifications, for example, depending on how many and what types of cables 120 will be stored in the system 100.

Referring again to FIG. 3, the system 105 can include a weighted disk 138 within the housing 105. For example, the weighted disk 138 may be located within the storage space 136 of the housing 105. The weighted disk 138 can have a weight that is specifically selected to maintain the system 100 in a substantially stationary position on a substantially level surface. There may be several reasons why it is important to prevent the system 100 from moving or shifting around on a surface. For example, it may be desirable to keep the system 100 in a designated location, especially when surface area is limited. As another example, accidental movement of the system 100 may cause the cables 120 and/or any electronic devices 122 coupled thereto to shift, collide into each other, and/or become tangled. According to some embodiments, the weight of the weighted disk 138 may be at least greater than a weight of the cables 120 stored within the housing 105. In one embodiment, the weight of the weighted disk 138 is approximately equal to the weight of a hockey puck (e.g., between 5.3 ounces and 5.8 ounces). While in the illustrated embodiment the weighted disk 138 is shown as having a circular shape, the system 100 is not limited to a circular weighted disk 138 and can have a disk with any other shape in accordance with the principles described herein.

As shown in FIG. 3, the system 100 can include a spool 140 in the central hub 136 of the housing 105. While passing through the housing 105 (e.g., between an entry port 112 and an exit port 114), at least a portion of the cables 120 can be wrapped around the spool 140, so as to store the cables 120 in an organized manner and/or prevent tangling, knotting, and/or jumbling thereof. According to the illustrated embodiment, the spool 140 can be substantially cylindrical with one or more sidewalls and a substantially circular cross-section. In other embodiments, the spool 140 can have a different shape, cross-section, or appearance (e.g., an elongated prism with a square or rectangular cross-section, an elliptical cylinder with an oval cross-section, etc.) As shown in FIG. 3, the spool 140 may have a height that is equal to, or slightly less than, a height of the housing 105. In one embodiment, the spool 140 may be specifically dimensioned (e.g., height and diameter or width) to accommodate up to seven cables 120 at a time within the housing 105.

Referring again to FIG. 3, the weighted disk 138 can have a central aperture 142. The central aperture 142 can be shaped and sized to receive at least a portion of the spool 140 therethrough. For example, the shape of the central aperture 142 may be designed to match the cross-sectional shape of the spool 140, and/or a diameter of the central aperture 142 may be the same as, or slightly larger than, the diameter of the spool 140. The spool 140 can have tabs 144 that are radially arranged around the sidewalls of the spool 140 to support the weighted disk 138 and to prevent the disk 138 from sliding down to the base of the spool 140. The tabs 144 also prevent the weighted disk 138 from resting on, and possibly crushing, the cables 120 that may be located in the storage space 136 below the weighted disk 138. At the same time, the tabs 144 can allow the weighted disk 138 to hover close enough to, or suspend just above, the cables 120 in the storage space 136, so as to prevent the cables 120 from shifting out of place within the housing 105.

As shown in FIG. 3, the system 100 can include a face plate 146 on a top surface of the cover 132 of the housing 105. The face plate 146 can have one or more tabs 148 that may be inserted into one or more slits 150 located in the top surface of the cover 132. The slit(s) 150 can be configured to create a snug fit when the tab(s) 148 are inserted therein, so as to prevent the tab(s) 148 from accidentally slipping out and to keep the face plate 146 secured to the cover 132. The face plate 146 can allow customization of the system 100 according to personal taste, with a logo (e.g., for a sports team, a company, a school, a musical group, etc.), with a photograph or other printed image, in one or more colors, and/or according to any other design.

In some embodiments, the face plate 146 can be a transparent lens that protects a picture or other printed image 152 inserted between the face plate 146 and the top surface of the cover 132. According to this embodiment, the printed image 152 may be interchangeable with other printed images 152, thus allowing the user to change the face of the system 100 as often as desired. In one embodiment, the printed image 152 can be a standard or preset image provided by a manufacturer of the system 100 and/or a company that has commissioned the manufacture of the system 100. For example, a company may choose to place its logo on the face of the system 100. In another embodiment, the system 100 can be configured to allow a customized/personalized printed image 152 to be inserted under the face plate 146. For example, a user may print a photograph and cut it to fit the space under the face plate 146. In one embodiment, the user may visit a website associated with a manufacturer of the system 100 and from there, create/customize and print the image 152. In other embodiments, the face plate 146, itself, may include an image, photograph, logo, or other design.

Referring back to FIG. 3, an anti-skid back plate 154 can be included on, or attached to, a bottom surface of the housing 105 and can be configured to reduce skidding and/or slippage of the housing 105 when the system 100 is placed on a substantially level surface. For example, the anti-skid back plate 154 can be comprised of a material that provides grip to the bottom of the housing 105. In one embodiment, the back plate 154 may be made of rubber, foam, and/or silicone. In another embodiment, the back plate 154 may include a hook and loop fastener and a corresponding hook and loop fastener may be attached the surface on which the system 100 will rest. According to this embodiment, the system 100 can be placed on a vertical surface, such as, for example, on a wall, on a side of a computer terminal, etc.

Figure 4:
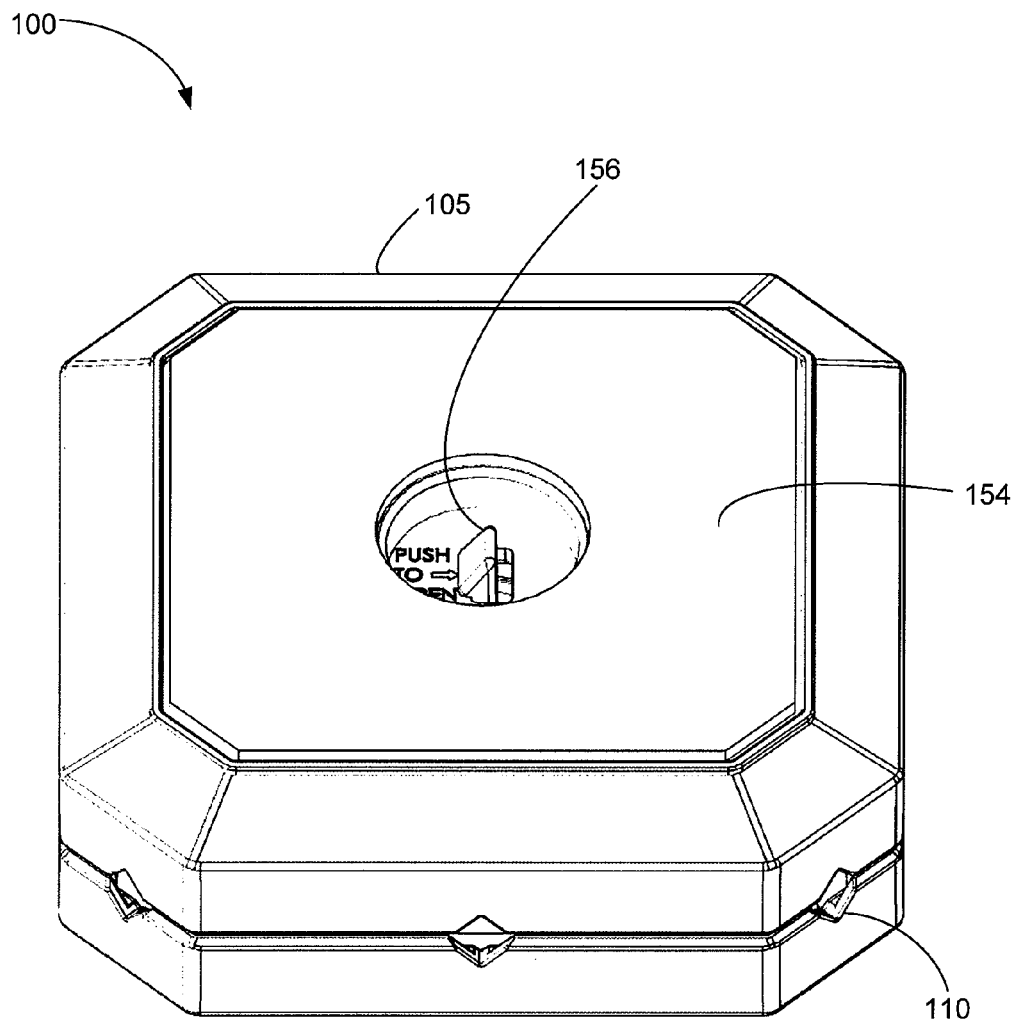
FIG. 4 is an illustration showing a bottom view of the multi-cable management system shown in FIG. 1.

Referring now to FIG. 4, shown is a bottom view of the system 100 in which a latch 156 of the system 100 is visible. The latch 156 can be a portion of a spring-loaded locking mechanism (not shown) for securely and detachably coupling the cover 132 to the base 134 in order to keep the cables 120 contained within the housing 105. In FIG. 4, the latch 156 is shown as being in a locked position. Upon moving to the locked position, the latch 156 may extend through a slot (not shown) in the base 134 and attach to a surface of the base 134. According to the illustrated embodiment, the user can unlock the latch 156 by sliding or pushing the latch 156 in a predefined direction (e.g., left or right). Upon moving to the unlocked position, the latch 156 passes through the slot and become detached from the surface of the base 134. In one embodiment, after the housing 105 is opened, the locking mechanism is activated by aligning the edges of the cover 132 and the base 134 and pressing the two portions of the housing 105 together until the latch 156 snaps into the locked position. As illustrated in FIG. 1, the spring-loaded locking mechanism can also include a pair of latches 158 that are visible on a top surface of the housing 105 and securely and detachably couple the base 134 to the cover 132. Like the latch 156, the pair of latches 158 snap into a locked position upon pressing the cover 132 and the base 134 together. FIGS. 1 and 4, and the accompanying description, show only one possible locking mechanism for the system 100. Any of a number of locking mechanisms may be used to detachably couple the cover 132 to the base 134 in accordance with the principles disclosed herein.

Figure 5:
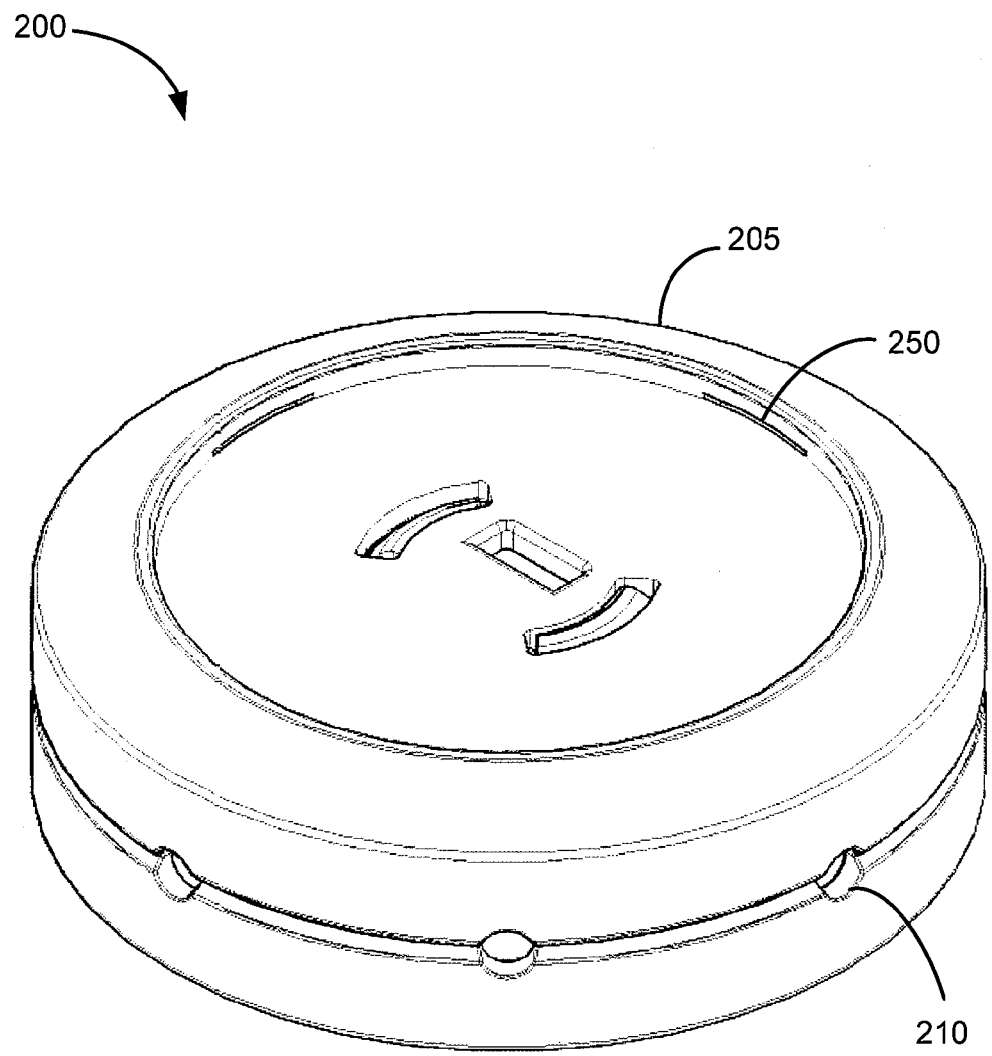
FIG. 5 is an illustration showing a perspective view of a second embodiment of a multi-cable management system.

In FIGS. 1-3, the housing 105 of the system 100 is shown as having a square-like shape with chamfered corners. However, the system 100 is not limited to the illustrated housing shape and can have other shapes in accordance with the principles disclosed herein. For example, FIG. 5 shows an embodiment wherein a system 200 includes a housing 205 with substantially round-shape. Other possible shapes for the housing 105 include, but are not limited to, a square shape, a rectangular shape, an oval shape, a diamond shape, a hexagonal shape, and an octagonal shape.

The housing 105 can be made of plastic (e.g., ABS plastic) or any other light-weight, non-conductive material. The face plate 146 may also be made of plastic. The housing 105 may be provided in any of a number of colors and/or have any of a number of designs printed thereon.

In some embodiments, the system 100 can include a plurality of cables that may be coupled to various electronic devices. For example, the system 100 may include one or more universal phone charging cables, USB cables, headphone cables, Ethernet cables, and/or other types of cables. In one embodiment, the plurality of cables may be pre-installed within the housing 105 to provide the user with a "ready-to-use" product that may be used out of the box to couple various electronic devices to respective cables.

As described herein and illustrated in the figures, the system 100 can be used to store and organize multiple cables 120 associated with various electronic devices 122 by, for example, passing one end of the cables 120 through respective openings 110 that are radially arranged around the housing 105 and passing an opposite end of the cables 120 through another opening 110 (e.g., exit port 114) for connection to an electric socket, a communication port, or another electronic device. In addition, the system 100 can include the weighted disk 138 within the housing 105 and/or the anti-skid back plate 154 on the bottom of the housing 105 to prevent the system 100 from shifting out of place during use, especially when placed on a glossy or slippery surface.

It should be emphasized that the above-described embodiments, particularly, any "preferred" embodiments, are possible examples of implementations, merely set forth for a clear understanding of the principles of the invention. Many variations and modifications may be made to the above-described embodiment(s) of the invention without substantially departing from the spirit and principles of the invention. All such modifications are intended to be included herein within the scope of this disclosure and protected by the following claims.

What is claimed is:

1. A system for managing a plurality of cables connectable to one or more electronic devices, the system comprising:
   a two-piece housing, the two-piece housing having a cover having a top portion and at least one lateral sidewall, and a base having a bottom portion and at least one lateral sidewall;
   a plurality of openings in the housing, each opening having a top portion formed in the at least one lateral sidewall of the cover, and a bottom portion formed in the at least one lateral sidewall of the base, each opening being dimensioned to receive one or more cables entering and/or exiting the housing, at least one of the plurality of openings being dimensioned to receive two or more of the plurality of cables at a given time, each of the top portion of the cover, the at least one lateral sidewall of the cover, the bottom portion of the base, and the at least one sidewall of the base having inner surfaces;
   an inner space defined by the inner surfaces of the top portion of the cover, the at least one lateral sidewall of the cover, the bottom portion of the base, and the at least one sidewall of the base, the inner space being configured to store at least a portion of each of the plurality of cables within the housing;
   a spool located within the inner space and disposed on the inner surface of the bottom portion of the base, the spool being configured to receive the plurality of cables;
   a weighted disk located within the inner space, the weighted disk having a weight sufficient to maintain the system in a substantially stationary position on a substantially level surface; and
   one or more tabs radially disposed on the spool within the housing, the one or more tabs being configured to suspend the weighted disk above the cables stored in the inner space.

2. The system of claim 1, wherein the at least one of the plurality of openings is dimensioned to simultaneously receive all of the plurality of cables.

3. The system of claim 1, wherein a first one of the plurality of openings has a shape and/or diameter that is different from a second one of the plurality of openings.

4. The system of claim 1, further comprising: a back plate attached to the bottom portion of the base, the back plate being configured to prevent skidding and/or slippage of the housing when placed on a substantially level surface.

5. The system of claim 4, wherein the back plate is comprised of rubber or silicone.

6. The system of claim 4, wherein the back plate includes a hook and loop fastener.

7. The system of claim 1, further comprising: a face plate detachably coupled to the top portion of the cover.

8. The system of claim 1, further comprising a latch configured to couple the cover to the base.

9. The system of claim 1, wherein the plurality of openings are positioned at equally spaced apart locations around the housing.

10. The system of claim 1, wherein the plurality of openings are radially arranged around the housing.

11. The system of claim 1, wherein the plurality of openings includes eight openings.

12. The system of claim 11, wherein the inner space of the housing is configured to store at least seven cables.

13. The system of claim 1, wherein the plurality of openings have a circular shape.

14. The system of claim 1, wherein the plurality of openings have a polygonal shape.

\* \* \* \* \*